Dec. 6, 1938.   H. C. HOWELL   2,139,619
METHOD FOR THE PRODUCTION OF MINERAL SURFACED ROOFING
Filed Feb. 15, 1937
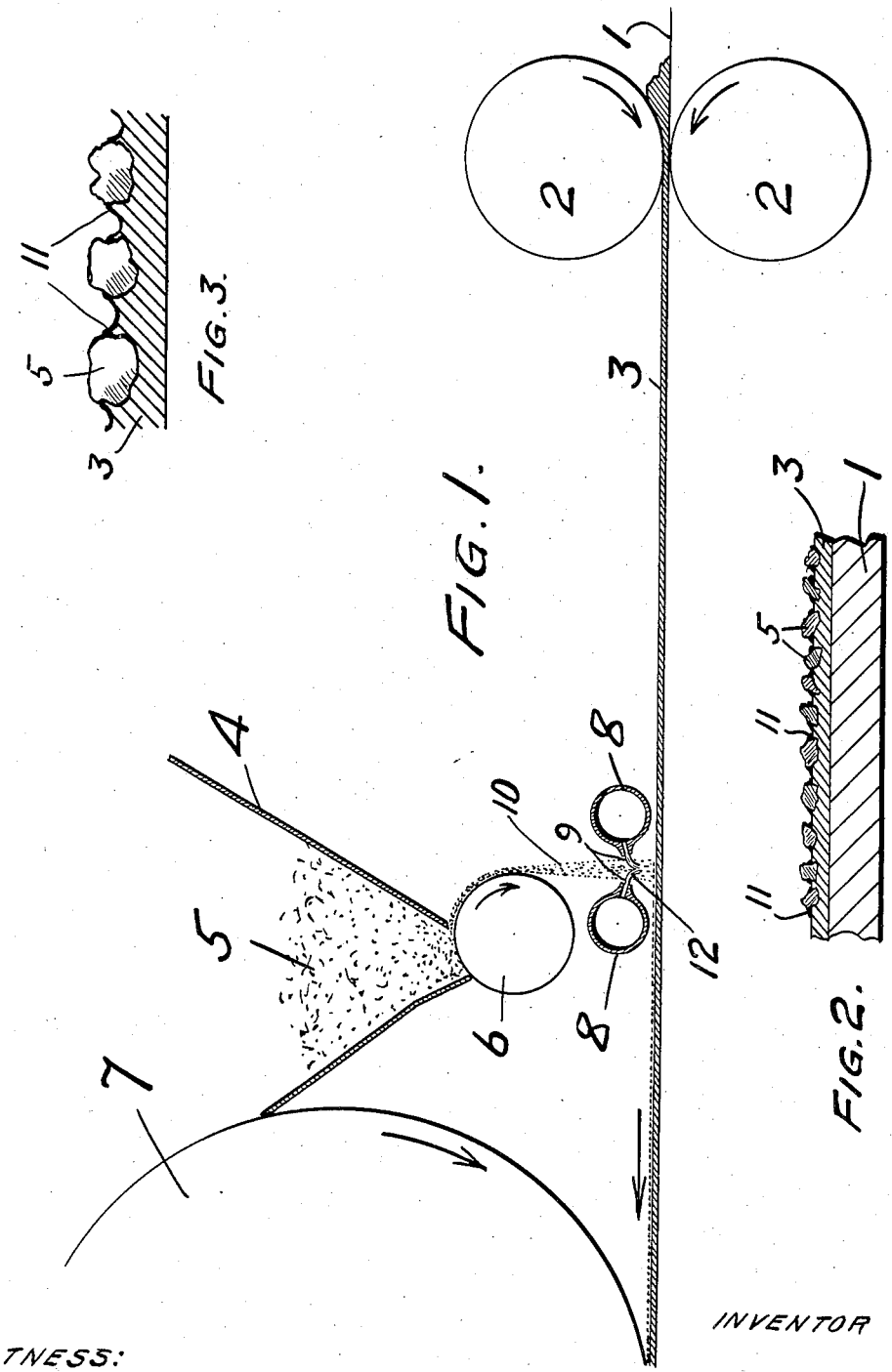
INVENTOR
Henry Clay Howell
BY
ATTORNEYS.
WITNESS:

Patented Dec. 6, 1938

2,139,619

UNITED STATES PATENT OFFICE 2,139,619

METHOD FOR THE PRODUCTION OF MINERAL SURFACED ROOFING

Henry Clay Howell, Rahway, N. J., assignor to Barber Asphalt Corporation, a corporation of New Jersey Application February 15, 1937, Serial No. 125,706

5 Claims. (Cl. 91—70)

This invention relates to an improvement in method and apparatus for the production of mineral surfaced roofing, as, for example, roofing surfaced on the weather side with granulated slate or equivalent mineral material.

As is well known, mineral surfaced roofing comprises a base, as felt, impregnated and coated with bitumen, as asphalt, and surfaced with a granular material, as granulated slate, glazed granular material, or the like.

In the production of mineral surfaced roofing the base is customarily impregnated and surfaced with bitumen at a temperature at which the bitumen is molten and relatively fluid, and the granular surfacing material is showered from a supply onto the coated surface of the base before the coating has cooled and while it is still in a relatively fluid condition. The granular surfacing material falling upon the coating penetrates or sinks into it to a degree and is finally pressed into the coating by cooperation of the surfaced strip with a drum or press rolls.

Surfaced roofing as heretofore produced has been open to a serious objection from the fact that the granular surfacing material has poor adherence or bond with the coating, and hence soon falls away from the roofing.

Various efforts have been made to determine the cause of, and a remedy for, the poor adherence or bond between the granular surfacing material and the coating, and it has been generally recognized that the cause lies in the fact that the granules falling upon the coating in a cold state locally chill the coating causing it to tend to locally contract away from the granules so as to form a convex meniscus or a negative contact angle with them, both of which indicate non-wetting of the granule by the asphalt. As a further cause, it has been recognized that if moisture is present at the surfaces of the granular material, vapor, generated on contact of the material with the hot coating, acts to prevent bonding. Either or both of these conditions tend to prevent proper wetting of the granules by the coating. Coating having too low a temperature is another and prime cause of poor wetting, and thus poor adherence.

As a remedy, it has heretofore been suggested to heat the granular surfacing material as a whole before applying it to the coated base. Such procedure has, however, been found to be signally unsuccessful, since the granular material heated as a whole is found to penetrate so deeply into the coating that the thickness of coating film between granules and felt is either too thin or lacking entirely which is not conducive to satisfactory service.

Now, in accordance with this invention, it has been found that an excellent bond between granular surfacing material and coating is accomplished by heating of the granular material locally at the surface only before application, as compared with heating the material as a whole.

More particularly, this invention contemplates locally surface heating the granular material in its passage in a shower to the coated strip, as by causing it to pass through a zone of intense heat located relatively close to the surface of the coated strip.

As a result of this invention the granular material, on striking the coating, will not carry any moisture adjacent its surface; nor will it, on coming in contact with the coating, cause local contraction thereof by cooling it, but, to the contrary, the coating will receive and wet the granules with the formation of a very substantial concave meniscus or positive contact angle with them, both of which indicate wetting of the granule by the asphalt. Furthermore, since the granular material is surface heated only, it will not carry sufficient heat to cause it to penetrate through the coating deeper than is desirable.

Another advantage of this method is a possible reduction in the total heat content of the finished roofing because a cooler coating than usual can be used with surface heated granules. Also, less total heat is put into finished roofing when surface heated granules are used than when a combination of cooler coating and totally heated granules are used.

Still another advantage is greater flexibility in the operation of applying granules since the granules may be applied at a greater distance from the coating rolls than when applying cold granules. Also when desired the heating medium may be put in such spaced relationship with the travelling sheet that additional heat is imparted to the surface of the coating at the same time the granules are being surface heated.

Having now indicated variously the nature and purpose of this invention, I shall proceed, with reference to the accompanying drawing, to describe a preferred procedure and apparatus for its practical adaptation and from which various details and practical advantages will be made apparent.

Fig. 1 is a diagrammatic showing of a form of apparatus embodying this invention and adapted for use in carrying out the method thereof.

Fig. 2 is a sectional view of a piece of mineral surfaced roofing produced according to this invention.

Fig. 3 is a detail view.

In the drawing, 1 indicates a strip of roofing felt impregnated in any usual manner with bitumen, as asphalt. 2, 2 are a pair of coating rolls of well known construction and mode of operation for application to the impregnated strip of a coating 3 of bitumen, as asphalt.

4 indicates any well known form of hopper or showering trough adapted to contain granular surfacing material 5, as granulated slate, glazed granular material, as glazed sand, or the like. The hopper or showering trough 4 is constructed with the usual longitudinal discharge opening in its bottom, and the passage of granular material from the hopper is controlled by the usual feed roll 6.

7 indicates a drum or press roll of well known form and which cooperates in well known manner with the surfaced roofing strip to press the surfacing material firmly into the coating.

8, 8 are a pair of gas burners, connected at one end with a suitable source of gas and air and extending longitudinally in spaced parallel relation beneath the feed roll 6. The burners are so located that the granular material passing from the feed roll to the roofing strip will pass between them, and the apertures of the burners are located so that when the burners are lighted, the flames 9, 9 from the burners respectively, will oppose each other in the path of the falling granular material. The burners 8, 8 are desirably, though not necessarily, located relatively close to the surface of the roofing strip.

Instead of a pair or series of gas burners, radiant heaters or surface combustion heaters may be used. I do not wish to limit myself to the type of heating medium. Any means by which the granules can be surface heated by passage through a zone of intense heat may be used. I will continue to use the gas burners as illustrative of the apparatus to carry out the methods.

In proceeding in accordance with this invention with use of the apparatus described, the impregnation of the strip 1 and the application of the coating 3 are accomplished in the usual and well known manner, the strip being led through an impregnating bath and between the coating rolls 2, 2.

From the coating rolls 2, 2, the coated strip is led beneath the burners 8, 8 and to the drum or press roll 7. In the travel of the strip it receives granular material from the hopper or trough 4. The granular material, it will be noted, passes from the hopper to the travelling strip through the opposed flames 9, 9 in a shower 10.

The granules, on passing through the flames 9, 9, divert the flames downwardly, as shown at 12, Fig. 1, and the granules are heated locally at their surface, without being bodily heated, and any moisture carried by the granules at their surface is removed. Desirably the temperature of the granules locally of their surface is raised 50–200° F. above room temperature.

The burners may be so located in their distance above the sheet that when desired the downwardly deflected flame impinges upon the coating surface heating it as well as the granules.

When other means are employed in place of the burners, such as, for example, surface combustion heaters, an additional heater or heaters may be placed so as to surface heat the coating before or after or both before and after the surface heated granules fall upon the coating.

The surface heated granules, on striking the coating 3, penetrate into it, and since the surfaces of the granules contacting with the coating are heated, the hot coating readily wets the granules with the formation of a relatively high concave meniscus 11, (Fig. 2). The granules, since they are not bodily heated, do not tend to penetrate through the coating 3 to the base 1, the surface heating of the granules acting merely to render them readily wet by the hot coating material.

It will be appreciated that the above description of procedure and apparatus in accordance with this invention is illustrative only for a clear understanding of the invention, and that various modifications in detail may be made without departing from the scope of the invention.

What I claim and desire to protect by Letters Patent is:

1. The method of producing mineral surfaced roofing which comprises providing a bitumen coated base, and while the bitumen coating is in a heated state, applying thereto granules heated locally of their surfaces only, the temperature to which the granules are heated locally of their surfaces being such with respect to the temperature of the bitumen that the granules will not become totally embedded in the bitumen.

2. The method of producing mineral surfaced roofing which comprises providing a bitumen coated base, and while the bitumen coating is in a heated state, showering granular material thereon while subjecting the granular material to local surface heating, the temperature to which the granules are heated locally of their surfaces being such with respect to the temperature of the bitumen that the granules will not become totally embedded in the bitumen.

3. The method of producing mineral surfaced roofing which comprises providing a bitumen coated base, and while the bitumen coating is in a heated state, showering granular material thereon through a flame, the temperature to which the granules are heated locally of their surfaces being such with respect to the temperature of the bitumen that the granules will not become totally embedded in the bitumen.

4. The method of producing mineral surfaced roofing which comprises providing a bitumen coated base, passing the bitumen coated base beneath a shower of granules and heating the granules in the shower locally of their surfaces at a point adjacent the surface of the coated base, the temperature to which the granules are heated locally of their surfaces being such with respect to the temperature of the bitumen that the granules will not become totally embedded in the bitumen.

5. The method of producing mineral surfaced roofing which comprises providing a bitumen coated base, and while the bitumen coating is in a heated state, showering granular material thereon through a zone of intense heat of an extent in the direction of travel of the granules such as to heat the granules locally of their surfaces only, the temperature to which the granules are heated locally of their surfaces being such with respect to the temperature of the bitumen that the granules will not become totally embedded in the bitumen.

HENRY CLAY HOWELL.